United States Patent [19]

Hales et al.

[11] Patent Number: 5,464,558
[45] Date of Patent: Nov. 7, 1995

[54] POLYMERS AND DETERGENT COMPOSITIONS CONTAINING THEM

[75] Inventors: Stephen G. Hales, Willaston; Ezat Khoshdel, Neston; Robert Polywka, Mickle Trafford, all of United Kingdom

[73] Assignee: Lever Brothers Company, Division of Conopco, Inc., New York, N.Y.

[21] Appl. No.: 368,530

[22] Filed: Jan. 4, 1995

Related U.S. Application Data

[62] Division of Ser. No. 44,523, Apr. 7, 1993 5,439,997.

[30] Foreign Application Priority Data

Apr. 9, 1992 [GB] United Kingdom ............... 9207795

[51] Int. Cl.⁶ .................................................. C08F 24/00
[52] U.S. Cl. .................... 252/174.24; 252/174.23; 252/DIG. 2; 252/DIG. 11; 526/270; 526/271; 526/311; 526/318.2; 526/318.3
[58] Field of Search ...................... 252/174.24, 174.23, 252/DIG. 2, DIG. 11

[56] References Cited

U.S. PATENT DOCUMENTS

| | | | |
|---|---|---|---|
| 3,761,412 | 9/1973 | Lancelot et al. | 252/550 |
| 3,764,586 | 10/1973 | Lancelot et al. | 260/78.4 R |
| 4,144,226 | 3/1979 | Crutchfield et al. | 528/231 |
| 4,169,934 | 10/1979 | Papanu | 525/418 |
| 4,219,437 | 8/1980 | Papanu | 252/174.21 |
| 4,847,005 | 7/1989 | Christ | 252/545 |
| 4,923,941 | 5/1990 | Bailey | 526/268 |
| 4,963,629 | 10/1990 | Driemel et al. | 526/200 |
| 5,147,576 | 9/1992 | Montague et al. | 252/174 |
| 5,332,527 | 7/1994 | Heinzman et al. | 252/546 |

*Primary Examiner*—Paul Lieberman
*Assistant Examiner*—Wyatt B. Pratt
*Attorney, Agent, or Firm*—James J. Farrell

[57] ABSTRACT

Carboxylic polymers useful in detergent compositions contain keto structural units incorporated into the polymer backbone. The units may be introduced by means of the compound 2,2'-diphenyl-4-methylene-1,3-dioxolane. The polymers show better biodegradability than the acrylic and acrylic/maleic polymers commonly used in detergent compositions, while the detergency building (calcium binding) is comparable or better.

15 Claims, No Drawings

POLYMERS AND DETERGENT COMPOSITIONS CONTAINING THEM

This is a divisional of Ser. No. 08/044,523, filed Apr. 7, 1993, now U.S. Pat. No. 5,439,997.

TECHNICAL FIELD

The present invention is concerned with novel polycarboxylate polymers and their use as builders in detergent compositions.

BACKGROUND AND PRIOR ART

Polycarboxylate polymers, especially acrylic and maleic polymers, are well-known ingredients of detergent compositions and provide various benefits. They are used, for example, as antiredeposition and antiincrustation agents; for detergency building, especially in conjunction with water-insoluble aluminosilicate builders; and for the structuring of detergent powders.

Published documents describing the use of acrylic and maleic polymers in detergent compositions include GB 1 460 893 (Unilever) which discloses polyacrylates; EP 25 551B (BASF) which discloses acrylic/maleic copolymers; and EP 124 913B (Procter & Gamble) which discloses detergent compositions containing combinations of polyacrylate and acrylic/maleic copolymer.

Although various polycarboxylate polymers have been disclosed in the literature as detergent ingredients, only polyacrylates and acrylate/maleate copolymers have found widespread use in commercial detergent products. These polymers, however, are not biodegradable.

The present invention is based on the discovery that the incorporation of ketone units into the backbone of such carboxylic polymers results in improved biodegradability without loss of detergency building (calcium binding) capacity. These units may be introduced into the polymer by means of the compound 2,2'-diphenyl-4-methylene-1,3-dioxolane or a related compound. The polymerisation reaction is controllable, may be readily carried out at atmospheric pressure, neat or in aqueous or non-aqueous solution, to give high yields of biodegradable polymers of good calcium binding capacity.

U.S. Pat. No. 3,761,412 and U.S. Pat. No. 3,764,586 (Lancelot et al/FMC Corporation) disclose poly-beta-keto acids, useful as detergency builders, which are copolymers of carbon monoxide gas and maleic anhydride. The polymerisation reaction requires high pressure and the presence of an organic solvent, and yields are poor (typically 12–24%).

EP 281 139A (Mitsubishi) discloses terpolymers of ethylene (or other lower olefin), maleic anhydride and carbon monoxide which are useful as biodegradable detergency builders. The presence of the olefin facilitates the polymerisation process and improves yield, but the polymerisation process still requires high pressure and high temperature, and is not consistently reproducible.

A different approach is described in JP 02 073 811A (Hitachi) which discloses a copolymer of acrylic acid and 2-cyclohexen-1-one, useful as a detergency builder.

2,2'-diphenyl-4-methylene-1,3-dioxolane and its homopolymers were first described by Y Hiraguri and T Endo, J Am Chem Soc 1987, 109, 3779–3780. Further studies involving related compounds, and copolymers with non-carboxylic vinyl monomers, are described in three papers by the same authors in J Polymer Science: Part A, Polymer Chem 1989, 27, 2135–3138 and 4403–4411, and Part C, Polymer Lett 1989, 27, 1–4. However, there is no disclosure of copolymerisation of this material with carboxylic monomers.

DEFINITION OF THE INVENTION

The present invention accordingly provides a polymer composed of at least two different structural units, said polymer comprising (i) structural units containing a group of the formula I

wherein

R represents a hydrogen atom, a $C_1$–$C_3$ alkyl or hydroxyalkyl group, or a group of the formula $A_2$—COOM, each of $A_1$ and $A_2$, which may be the same or different, represents a direct bond or an optional spacer group containing from 1 to 4 carbon atoms, M represents a hydrogen atom or a solubilising cation; and (ii) structural units of the formula II

The invention further provides the use of a polymer as defined in the previous paragraph as a binder of divalent and polyvalent metals, and in particular as a detergency builder in a detergent composition.

Thus the invention further provides a detergent composition comprising at least one detergent-active compound and also comprising a detergency builder system consisting wholly or partially of a polymer as claimed above.

The invention also provides a process for the preparation of a polymer as defined in the previous paragraph, which comprises copolymerising (i) an unsaturated carboxylic acid or salt or anhydride thereof, and (ii) a compound of the formula VI

wherein each of $R_4$ and $R_5$, which may be the same or different, represents a group capable of stabilising a free radical, in the presence of a free radical initiator.

DETAILED DESCRIPTION OF THE INVENTION

The Polymer

The first subject of the invention is a novel polymer. The polymer contains at least two different kinds of structural units, and is characterised by the presence of structural (monomer) units (i) containing carboxylic acid or carboxylate groups, bonded to the carbon backbone either directly or via a short spacer unit, and structural units (ii) containing keto groups of the formula

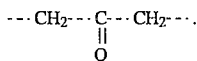 (II)

These units (ii) may be distinguished from the keto groups present in the polymers disclosed in U.S. Pat. No. 3,761,412 and U.S. Pat. No. 3,764,586 (Lancelot et al/FMC Corporation) and EP 281 139A (Mitsubishi) discussed above, which have the formula

Preferably the polymer comprises from 70 to 99 mole % of units (i) and from 1 to 30 mole % of units (ii). If desired, two or more different units (i) may be present; and the presence of minor amounts of other non-interfering monomer units is not excluded.

More preferably the polymer comprises from 80 to 95 mole % of units (i) and from 5 to 20 mole % of units (ii).

The number average molecular weight preferably ranges from 1000 to 200,000, more preferably from 2000 to 50,000 and most preferably from 3000 to 30,000.

The weight average molecular weight preferably ranges from 2000 to 2,000,000, more preferably from 3000 to 1,000,000, and most preferably from 4000 to 900,000.

The Units (i)

The units (i) are derived from an unsaturated carboxylic monomer in free acid, salt, ester or anhydride form. Preferably at least one carboxyl group is bonded directly to the polymer backbone (main carbon chain), that is to say, the spacer group $A_1$ in the formula I given previously simply represents a direct bond. However, that is not an essential feature of the invention and all carboxyl groups present may be separated from the polymer backbone by a spacer group containing from 1 to 4 carbon atoms, and optionally also containing one or more oxygen atoms.

In the carboxyl group —COOM, M is preferably a hydrogen atom or a sodium, potassium, ammonium or lower-alkyl-substituted ammonium ion, and most preferably a sodium ion.

Preferred units (i) have the formula III:

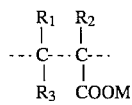 (III)

wherein each of $R_1$ and $R_2$, which may be the same or different, represents a hydrogen atom or a methyl or ethyl group; and $R_3$ represents a hydrogen atom or the group —COOM.

Those units in which $R_3$ is a hydrogen atom are derived from acrylic acid (or its salts) and its alkyl substitution products; and those units in which $R_3$ is the group —COOM are derived from maleic acid (or its salts) or maleic anhydride, and its alkyl substitution products.

Especially preferred units (i) are those of the formula IIIa, derived from acrylic acid itself (or its salts):

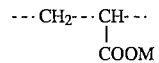 (IIIa)

and those of the formula IIIb, derived from maleic acid (or its salts) or maleic anhydride:

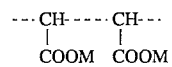 (IIIb)

Advantageously both acrylic units of the formula IIIa and and maleic units of the formula IIIb may be present.

Another carboxylic monomer of interest is itaconic acid (and its salts), giving units of the formula IV:

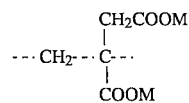 (IV)

This monomer gives units containing both main-chain-bonded and side chain carboxyl groups.

An example of a carboxylic monomer in which all carboxyl groups are separated from the polymer by a spacer group is allyl succinic acid, which gives units of the formula V:

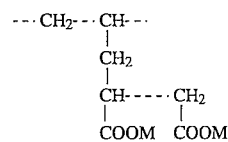 (V)

The Units (ii)

The units (ii) may be derived from a compound of the formula VI:

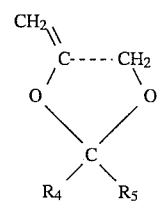 (VI)

wherein each of $R_5$ and $R_5$, which may be the same or different, represents a group capable of stabilising a free radical.

Preferably, one of $R_4$ and $R_5$ represents an aryl or cyano group, and the other represents an aryl, alkyl or cyano group.

Preferably at least one of $R_4$ and $R_5$ is a phenyl group, and the compound in which $R_4$ and $R_5$ both represent phenyl groups is especially preferred. This compound is 2,2'-diphenyl-4-methylene-1,3-dioxolane.

Compounds in which one of $R_4$ and $R_5$ is a phenyl group while the other is a straight-chain or branched chain alkyl group, for example, a methyl, ethyl, n-propyl, isopropyl, t-butyl or n-heptyl group have also been described in the literature. Also described is the compound in which one of $R_4$ and $R_5$ is a 2-naphthyl group and the other is a methyl group.

In yet another preferred compound, one of $R_4$ and $R_5$ is a methyl group and the other is a cyano group.

Compounds of the formula VI may be synthesised from -chloro-1,2-propanediol (formula VII) and the appropriate ketone $R_4COR_5$ (formula VIII), by a two-stage process involving a chloro-substituted intermediate (formula IX):

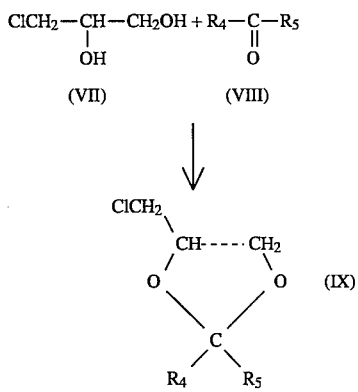

This first stage may be carried out in the presence of an acid catalyst, for example, toluene sulphonic acid, in an organic solvent. In the method described in the literature (Hiraguri and Endo, see above) benzene is used, but the present inventors have discovered that use of toluene instead is advantageous: the intermediate is then obtained in a state of such purity that no further purification is required before the second stage.

In the second stage, the intermediate IX may be converted to the methylene compound VI by means of a strong base, for example, sodium methoxide, in a solvent such as dimethyl formamide. When toluene is used as the first stage solvent, the final product is obtained in a sufficiently pure state that the only further purification required is removal of residual (second stage) solvent under reduced pressure. The overall yield is typically above 80%, substantially greater than the yields obtainable by the literature method.

On heating and in the presence of a free radical initiator, the methylene compound of the formula VI may be polymerised by a ring-opening reaction to form a polyketone, and the ketone $R_4COR_5$ regenerated, as shown in the reaction scheme below.

In the presence of a comonomer, therefore, this reaction can be utilised to introduce ketone functionality into a polymer. The ketone $R_4COR_5$ can be recycled for use in the synthesis of the compound VI.

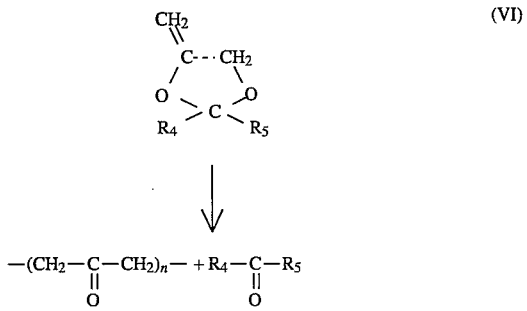

This provides a convenient route for the incorporation of ketone functionality into a carbon backbone polymer in a controllable manner. The reaction proceeds readily and controllably in bulk, aqueous solution or non-aqueous solution. The polymerisation may be conducted in an open vessel under nitrogen, or in a sealed tube under vacuum. High pressure is not required. The ketone by-product can be recycled.

The preferred polymerisation temperature range is within the range of from 60° to 130° C.

The copolymerisation reaction requires the presence of a free radical initiator. Examples of suitable initiators include sodium and potassium persulphate, 2,2-azobis (amidinopropane) hydrochloride, dibenzoyl peroxide (Lucidol), cyclohexanone peroxide, di-tert-butyl peroxide, 2,2-azobis-isobutyronitrile (AIBN), tert-butyl hydroperoxide, cyclohexylsulphonyl peroxide (Percadox ACS), diisopropylperdicarbonate (Percadox JPP), and cumene hydroperoxide. Preferred initiators for aqueous solution polymerisation are sodium or potassium persulphate.

The rate and extent to which the dioxolane ring opens is dependent on the choice of the substituents $R_4$ and $R_5$, and on the reaction temperature. It appears that one should be aromatic (preferably phenyl ), cyano, or t-butyl, in order to stabilise radical intermediates. When one of $R_4$ and $R_5$ is phenyl, the order of preference for the other is as follows: phenyl>isopropyl> n-heptyl>n-propyl>ethyl>methyl. When one of $R_4$ and $R_5$ is methyl, the compound in which the other is a 2-naphthyl group is preferred to the compound in which the other is a phenyl group.

Most preferably, both $R_4$ and $R_5$ are phenyl groups, and the preferred compound VI is then 2,2-diphenyl-4-methylene-1,3-dioxolane (DMD). Use of this compound has the additional advantage that the ketone by-product of the copolymerisation reaction is then benzophenone, a stable, high-melting solid which is essentially non-hazardous and lends itself to ease of handling both in the laboratory and in large scale manufacture.

Detergent Compositions

The novel detergency builders of the present invention may be incorporated in detergent compositions of all physical types, for example, powders, liquids, gels, and solid bars. They may if desired be used in conjunction with other detergency builders. They are especially intended to replace the functionally similar, but non-biodegradable, polymers widely used in detergent compositions.

The total amount of detergency builder in the compositions will suitably range from 15 to 80 wt %, and this may be constituted wholly or partially by the polymeric materials of the invention. The amount of polymer in the detergent composition may range, for example, from 1 to 80 wt %.

The polymeric builder of the the invention may advantageously be used in conjunction with an inorganic builder. Suitable inorganic builders include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Henkel); maximum aluminium zeolite P as described and claimed in EP 384 070A (Unilever); and layered silicates as disclosed in EP 164 514B (Hoechst).

Inorganic phosphate builders, for example, sodium orthophosphate, pyrophosphate and tripolyphosphate, may also be present, but the invention is of particular applicability to compositions containing reduced or zero levels of inorganic phosphate.

Organic builders that may additionally be present include polymeric polycarboxylates such as those described and claimed in EP 435 505A and EP 433 010A (Unilever), as well as unmodified polyacrylates and acrylic/maleic copolymers; monomeric polycarboxylates such as citrates, gluconates, oxydisuccinates, tartrate monosuccinates and disuccinates, glycerol mono-, di- and trisuccinates, carboxymethyloxysuccinates, carboxymethyloxymalonates, dipicolinates, hydroxyethyliminodiacetates, nitrilotriacetates, ethylenediaminetetraacetates, alkyl- and alkenyl malonates and succinates, and sulphonated fatty acid salts. This list is not intended to be exhaustive. However, it is preferred that any other builders present are also biodegradable.

Detergent compositions of the invention will also contain, as essential ingredients, one or more detergent-active compounds which may be chosen from soap and non-soap anionic, cationic, nonionic, amphoteric and zwitterionic detergent-active compounds, and mixtures thereof. The amount of detergent-active compound present is suitably within the range of from 0.5 to 60 wt %.

Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well known to those skilled in the art. Examples include alkylbenzene sulphonates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; alkyl ether sulphates; olefin sulphonates; alkane sulphonates; alkyl xylene sulphonates; dialkyl sulphosuccinates; and fatty acid ester sulphonates.

Nonionic surfactants that may be used include the primary and secondary alcohol ethoxylates, especially the $C_{12}$–$C_{15}$ primary and secondary alcohols ethoxylated with an average of from 3 to 20 moles of ethylene oxide per mole of alcohol; alkylpolyglycosides; and polyhydroxyamides (glucamides).

The choice of surfactant, and the amount present, will depend on the intended use of the detergent composition. For example, for machine dishwashing a relatively low level of a low-foaming nonionic surfactant is generally preferred. In fabric washing compositions, different surfactant systems may be chosen, as is well known by the skilled detergent formulator, for handwashing products and for machine washing products.

The total amount of surfactant present will of course depend on the intended end use and may be as low as 0.5% by weight, for example in a machine dishwashing composition, or as high as 60% by weight, for example in a composition for washing fabrics by hand. For fabric washing compositions in general, an amount of from 5 to 40% by weight is generally appropriate.

Detergent compositions suitable for use in most automatic fabric washing machines generally contain anionic non-soap surfactant, or nonionic surfactant, or combinations of the two in any ratio, optionally together with soap.

Detergent compositions according to the invention may also suitably contain a bleach system. Machine dishwashing compositions may suitably contain a chlorine bleach, while fabric washing compositions may contain peroxy bleach compounds, for example, inorganic persalts or organic peroxyacids, which may be employed in conjunction with activators to improve bleaching action at low wash temperatures.

Preferred inorganic persalts for inclusion in fabric washing compositions are sodium perborate monohydrate and tetrahydrate, and sodium percarbonate, advantageously employed together with an activator. Bleach activators, also referred to as bleach precursors, have been widely disclosed in the art. Preferred examples include peracetic acid precursors, for example, tetraacetylethylene diamine, now in widespread commercial use in conjunction with sodium perborate; and perbenzoic acid precursors. The novel quaternary ammonium and phosphonium bleach activators disclosed in U.S. Pat. No. 4,751,015 and U.S. Pat. No. 4,818,426 (Lever Brothers Company) are also of great interest.

Other materials that may be present in detergent compositions of the invention include sodium silicate, fluorescers, antiredeposition agents, inorganic salts such as sodium sulphate, enzymes, lather control agents or lather boosters as appropriate, pigments, and perfumes. This list is not intended to be exhaustive.

Detergent compositions of the invention may be prepared by any suitable method. Detergent powders are suitably prepared by spray-drying a slurry of compatible heat-insensitive components, and then spraying on or postdosing those ingredients unsuitable for processing via the slurry. The skilled detergent formulator will have no difficulty in deciding which components should be included in the slurry and which should be postdosed or sprayed on. The polymeric builder material of the invention may generally be included in the slurry if desired, although other methods of incorporation may of course be used if desired.

EXAMPLES

The invention will now be further illustrated by the following non-limiting Examples.

The polymers were characterised by infrared spectrometry and in some cases by nuclear magnetic resonance spectroscopy.

The infrared instrumentation used included the Nicolet (Trade Mark) 1705X Fourier Transform infrared spectrometer with MCT detector using the Nicolet 1280 processor, and the Nicolet SDXC Fourier Transform infrared spectrometer with DGS detector using the Nicolet 62 processor.

$^1$H and $^{13}$C NMR spectra were run on a Brucker (Trade Mark) WM 360 MHz Fourier Transform spectrometer.

Number-average and weight-average molecular weights of polymeric materials were determined by gel permeation chromatography. This was carried out using a Hewlett Packard (Trade Mark) HP 1090 liquid chromatograph fitted with a 30 cm×7.5 cm TSK gel linear GMPW column. Organic-solvent-soluble polymers were measured against polystyrene standards, and water-soluble polymers against polyethylene glycol.

Calcium Binding

The calcium binding properties of the polymers were measured by titration of the samples with a calcium chloride solution using a calcium-ion-selective electrode of the type Radiometer (Trade Mark) F2112Ca. The calcium binding constant $pK_{Ca^{2+}}$ was calculated by the method of C Tanford in Chapter 8, Multiple Equilibria, Physical Chemistry of Macromolecules, John Wiley, New York, 1961.

Values of $pK_{Ca^{2+}}$ of 4.0 or above represent materials likely to be useful as detergency builders, either alone or in conjunction with other builder materials. The value for sodium tripolyphosphate is 6.0, and any figure higher than this indicates excellent building.

Biodegradability

This was investigated by means of a test similar to the modified Sturm test as described in OECD Guideline 302b. This test measured $CO_2$ production from the test material under standard conditions, the polymer being enclosed in a sealed vessel inoculated with bacteria acclimatised to the test polymer in a sewage enrichment study.

Values of 25–35% conversion to $CO_2$ in the modified Sturm test and similar tests have frequently been reported for polymers, but that can be attributed to the presence of monomers and low-molecular-weight oligomers. Values of 50% and above in this type of test are an indication of superior biodegradability.

Example 1

Preparation of 2,2-diphenyl-4-methylene-1,3-dioxolane

The monomer was prepared by an improved method based on that described by Y Hiraguri and T Endo, J Am Chem Soc 1987, 109, 3779–3780, but using toluene instead of benzene as solvent. In the first stage, 3-chloro-1,2-propanediol (formula VII given previously) was reacted with benzophenone to give a chloro-substituted intermediate of the formula IX given previously, wherein $R_4$ and $R_5$ are both phenyl groups. In the second stage, the chloro-substituted intermediate of the formula IX was dehydrochlorinated.

A solution of 3-chloro-1,2-propanediol (22.1 g, 0.2 mole) and benzophenone (36.4 g, 0.2 mole) in toluene (150 ml) was refluxed in the presence of p-toluene sulphonic acid (0.5 g) until azeotropic removal of water had ceased. The toluene was removed under reduced pressure, at which point $^1H$ NMR showed the product (intermediate chloro-compound) to be essentially pure (100%). It was therefore carried forward to the second stage without further purification.

A solution of the intermediate chloro-compound (30.0 g, 0.11 mole) and sodium methoxide (12.0 g, 0.22 mole) in N,N'-dimethyl formamide (150 ml) was stirred for 3 hours at 50° C. The resulting mixture was poured into water and extracted with 3 portions of diethyl ether. The organic layer was separated and solvent removed under reduced pressure to yield the final product (71%), pure by $^1H$ NMR.

Example 2

Preparation of a Keto-Modified Acrylate/Maleate Polymer by a Bulk Polymerisation Method This Example describes the preparation and characterisation of a terpolymer containing acrylate and maleate units (95 mole % in total), and ketone units derived from 2,2-diphenyl-4-methylene-1,3-dioxolane (5 mole %), by a bulk polymerisation method.

This polymer contained the following units:

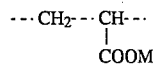   (IIIa)

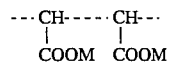   (IIIb)

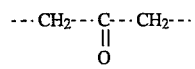   (II)

Acrylic acid (6.5 g, 0.09 mol), maleic anhydride (9.8 g, 0.1 mol) and 2,2-diphenyl-4-methylene-1,3-dioxolane (2.38 g, 0.01 mol) were charged to a sealed tube together with 2,2'-azo-bis-isobutyronitrile (200 mg, 7.5×10$^{-4}$ mmol).

The tube was then degassed three times by the freeze-thaw method, sealed, and placed in a preheated oil bath at 120° C. for 2 days.

The resulting solid was neutralised in situ with aqueous sodium hydroxide solution at about 50° C.

Benzophenone was filtered off and the solution was precipitated into a large excess of methanol. The polymer was isolated by filtration and finally dissolved in water and freeze dried to give better quality material. The yield was 24.14 g (104%: probably containing water of hydration).

Characterisation

| (i) Fourier transform infrared data (KBr wafer) | | |
|---|---|---|
| Short chain carboxylate | (C=O stretch) | 1580 cm$^{-1}$ |
| Ketone (shoulder) | (C=O stretch) | 1700 cm$^{-1}$ |
| (ii) $^1H$ NMR (deuterium oxide) | | |
| Chemical shift (ppm): | | |
| 0.8–3.5 | backbone protons (CH$_2$ and CH) | |
| (iii) $^{13}C$ NMR (deuterium oxide) | | |
| Chemical shift (ppm) | | |
| 30–62 | backbone carbons (CH$_2$ and CH) | |
| 180–200 | carboxylate and ketone groups | |
| (iv) GPC molecular weights | | |
| Number average ($M_n$) | | 23 850 |
| Weight average ($M_w$) | | 1 721 000 |

(v) Chemical characterisation

Further confirmation of the ketone functionality was carried out by the chemical reaction of the terpolymer with 4-nitrophenylhydrazine.

(vi) Calcium binding

The $pK_{Ca^{2+}}$ was 5.9.

(vi) Biodegradation

In two separate studies, conversions to $CO_2$ of 64% and 49% were found.

Comparative Example A

By the bulk polymerisation method of Example 2, a polymer containing 50 mole % each of acrylate and maleate units was prepared.

The $pK_{Ca^{2+}}$ was 5.8.

| GPC molecular weights: | |
|---|---|
| Number average ($M_n$) | 21 500 |
| Weight average ($M_w$) | 847 700 |
| Biodegradation: | |
| $CO_2$ conversion | 30%. |

Examples 3 to 6

By the bulk polymerisation method described in Example 2, the following terpolymers were prepared.

Example 3

| A terpolymer containing | 40 mole % acrylate units |
| --- | --- |
| | 50 mole % maleate units |
| | 10 mole % keto units |

The $pK_{Ca^{2+}}$ was 6.17.

| GPC molecular weights: | |
| --- | --- |
| Number average ($M_n$) | 6 700 |
| Weight average ($M_w$) | 438 000 |
| D = 65.4 | |

Example 4

| A terpolymer containing | 40 mole % acrylate units |
| --- | --- |
| | 50 mole % maleate units |
| | 10 mole % keto units |

The $pK_{Ca^{2+}}$ was 6.2.

| GPC molecular weights: | |
| --- | --- |
| Number average ($M_n$) | 12 100 |
| Weight average ($M_w$) | 34 000 |
| Biodegradation (two separate studies): | |
| $CO_2$ conversion (after dialysis) | 93%, 88% |

Example 5

| A terpolymer containing | 30 mole % acrylate units |
| --- | --- |
| | 50 mole % maleate units |
| | 20 mole % keto units |

$pK_{Ca^{2+}}=5.73$.

| GPC molecular weights: | |
| --- | --- |
| Number average ($M_n$) | 3 000 |
| Weight average ($M_w$) | 219 000 |
| D = 73.0 | |

Example 6

| A copolymer containing | 90 mole % itaconate units |
| --- | --- |
| | 10 mole % keto units |

This polymer contained the following units:

The calcium binding was excellent: $pK_{Ca^{2+}}=6.6$.

| GPC molecular weights: | |
| --- | --- |
| Number average ($M_n$) | 3 000 |
| Weight average ($M_w$) | 4 700 |
| D = 1.6 | |
| Biodegradation (two separate studies): | |
| $CO_2$ conversion | 43%, 29% |

Example 7

A terpolymer containing the following units:

allyl succinate (40 mole %):

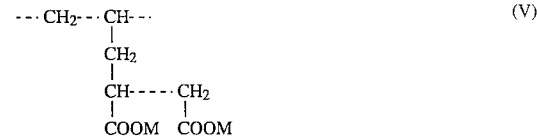

ketone (10 mole %:)

The calcium binding was excellent: $pK_{Ca^{2+}}=6.57$.

| GPC molecular weights: | |
| --- | --- |
| Number average ($M_n$) | 3 550 |
| Weight average ($M_w$) | 6 300 |
| D = 1.8 | |

Example 8

Preparation of a Keto-Modified Acrylate/Maleate Polymer by an Aqueous Solution Polymerisation Method This Example describes the preparation and characterisation of a terpolymer containing acrylate units (44.5 mole %), maleate units (44.5 mole %), and ketone units derived from 2,2-diphenyl-4-methylene-1,3-dioxolane (11 mole %), by an aqueous solution polymerisation method.

The reagents used were as follows:

| | |
|---|---|
| Acrylic acid (distilled) | 7.2 g/0.1 mol |
| Maleic anhydride | 9.8 g/0.1 mol |
| 2,2-diphenyl-4-methylene-1,3-dioxolane | 6.0 g/0.025 mol |
| Sodium hydroxide | 7.0 g/0.17 mol |
| Sodium persulphate | 2 × 0.24 g |
| Sodium dodecyl sulphate | 1.0 g |
| Water | |

The maleic anhydride was placed in a flanged flask reactor fitted with mechanical stirrer, nitrogen inlet, pressure equalising dropping funnel and condenser. A solution of the sodium hydroxide in water (32 ml) was prepared and about one third of this solution was added to the reactor. The reactor was heated to about 95° C., under nitrogen and with stirring, and the remainder of the sodium hydroxide solution was then added over 20 minutes.

The reaction mixture was kept under reflux for a further 10 minutes, and then about one quarter of the acrylic acid, diluted with 2.5 ml water, together with the 2,2-diphenyl-4-methylene-1,3-dioxolane, was introduced into the reactor. While stirring rapidly, the remainder of the acrylic acid was added together with half of the sodium persulphate (0.24 g in 2.5 ml water), over 2 hours. Finally, the remainder of the sodium persulphate was added incrementally over a second 2-hour period. After the addition was complete, the system was kept under reflux for a further 4 hours and then cooled to room temperature.

The resulting terpolymer was converted to its sodium salt by treatment with a 25% aqueous sodium hydroxide solution in an amount sufficient to achieve a pH of 7.6. The water was removed by azeotroping with isopropanol. The solid terpolymer (sodium salt) was treated with warm acetone to remove benzophenone produced in the polymerisation process. Further benzophenone was removed by addition of water and filtration. The filtrate was freeze-dried, giving 26.5 g of white powder, representing a 106% yield (probably containing water of hydration).

Characterisation (i) Molecular weight (gel permeation chromatography)

After removing low molecular weight species by ultrafiltration using a molecular weight 5000 cut-off membrane, the molecular weights (aqueous) were as follows:

$M_n$ 23 500
$M_w$ 62 700.

(ii) Semi-quantitative Fourier transform IR (KBr wafer)

The absorbances at 1736 cm$^{-1}$ (keto carbonyl band) and at 1580 cm$^{-1}$ (carboxylate anion carbonyl group) were measured and normalised against the alkane —CH$_2$— absorbance at 2933 cm$^{-1}$. This indicated that approximately 10 mole % of ketone groups had been incorporated into the polymer backbone.

(iii) Calcium binding

The $pK_{Ca^{2+}}$ value was 6.6.

(iv) Photodegradation

As a further proof of the presence of ketone groups in the polymer, a sample was subjected to photodegradation in an aqueous medium. A medium pressure mercury arc lamp was used to generate ultraviolet radiation mainly at 254, 265, 313 and 366 nm. Samples were taken at intervals over a seven-day period and analysed by FT-IR, NMR, and GPC.

GPC showed that the molecular weight of the polymer decreased rapidly as irradiation progressed, particularly over the first 24 hours. The polymer molecular weight was found to have been reduced by a factor of ten; this correlates with the theoretical content and random distribution of the backbone ketone groups.

| Degradation time | GPC molecular weight | | |
|---|---|---|---|
| (days) | $M_n$ | $M_w$ | D |
| 0 | 23500 | 62700 | 2.7 |
| 1 | 4800 | 8400 | 1.75 |
| 4 | 3180 | 6150 | 1.9 |
| 7 | 1850 | 3150 | 1.7 |

Comparison of the FT-IR spectra of the samples showed the development of a shoulder band at ca 1700 cm$^{-1}$, which became distinctive after seven days of irradiation. This may be attributed to the formation of methyl ketone end-groups.

Examination of the $^1$H NMR spectra showed two notable features:

a change in the pattern of the backbone protons (0.8–3.0 ppm) from three distinctive signals to two; and the appearance of two sharp peaks at 2.2 and 8.5 ppm, which may be assignable to the presence of methyl ketone and formyl groups respectively.

The $^{13}$C NMR spectra showed a change in the pattern of carboxylate and backbone resonances.

(v) Biodegradation (CO$_2$ conversion): 39%, 56%.

Example 9

A further polymer was prepared from the same monomers in the same proportions by the aqueous solution method of Example 8.

Calcium binding: $pK_{Ca^{2+}}$=6.0

Molecular weight: $M_n$ 16 900, $M_w$ 38 800.

The polymer sholwed all the expected spectroscopic characteristics, including IR (KBr disc) 1736 cm$^{-1}$, characteristic of the keto group.

Comparative Example B

By the aqueous solution method of Example 8, a polymer consisting of 78 mole % acrylate units and 22 mole % maleate units was prepared.

Calcium binding: $pK_{Ca^{2+}}$=5.4

Molecular weight: $M_n$ 10 200, $M_w$ 99 200

Biodegradation (CO$_2$ conversion): 7%.

We claim:

1. A detergent composition comprising at least one detergent-active compound and also comprising a detergency builder system consisting wholly or partially of a polymer of at least two different types of structural unit, said polymer consisting essentially of (i) structural units containing a group of the formula I

wherein R represents a hydrogen atom, a C$_1$–C$_3$ alkyl or hydroxyalkyl group, or a group of the formula A$_2$—COOM, each of A$_1$ and A$_2$, which are the same or different, represents a direct bond or an optional spacer group containing from 1 to 4 carbon atoms, M represents a hydrogen atom or a sodium, potassium, ammonium or lower-alkyl-substituted ammonium ion; and (ii) structural units of the formula II $$---CH_2-\underset{\underset{O}{\|}}{C}-CH_2---. \qquad (II)$$

2. A detergent composition as claimed in claim 1, comprising from 0.5 to 60 wt % of the detergent-active compound and from 15 to 80 wt % of detergency builder system consisting wholly or partially of the defined polymer.

3. A detergent composition as claimed in claim 1, containing from 1 to 80 wt % of the defined polymer.

4. A detergent composition as claimed in claim 1, wherein the polymer comprises units (i) of the formula III:

$$-\underset{R_3}{\overset{R_1}{\underset{|}{C}}}-\underset{COOM}{\overset{R_2}{\underset{|}{C}}}- \qquad (III)$$

wherein each of $R_1$ and $R_2$, which is the same or different, represents a hydrogen atom or a methyl or ethyl group; and $R_3$ represents a hydrogen atom or the group —COOM.

5. A detergent composition as claimed in claim 1, wherein the polymer comprises units (i) of the formula IIIa:

$$-CH_2-\underset{\underset{COOM}{|}}{CH}- . \qquad (IIIa)$$

6. A detergent composition as claimed in claim 1, wherein the polymer comprises units (i) of the formula IIIb:

$$-\underset{\underset{COOM}{|}}{CH}-\underset{\underset{COOM}{|}}{CH}- . \qquad (IIIb)$$

7. A detergent composition as claimed in claim 1, wherein the polymer comprises units (i) of the formula IIIa and units (i) of the formula IIIb.

8. A detergent composition as claimed in claim 1, wherein the polymer comprises units (i) of the formula IV:

$$-CH_2-\underset{\underset{COOM}{|}}{\overset{\overset{CH_2COOM}{|}}{C}}- . \qquad (IV)$$

9. A detergent composition as claimed in claim 1, wherein the polymer comprises units (i) of the formula V:

$$-CH_2-\underset{\underset{\underset{COOM}{|}}{\underset{CH_2}{|}}}{\overset{}{CH}}-\underset{COOM}{|}CH_2 \qquad (V)$$

10. A detergent composition as claimed in claim 1, wherein the polymer comprises from 70 to 99 mole % of units (i) and from 1 to 30 mole % of units (ii).

11. A detergent composition as claimed in claim 10, wherein the polymer comprises from 80 to 95 mole % of units (i) and from 5 to 20 mole % of units (ii).

12. A detergent composition as claimed in claim 1, wherein the polymer has a number-average molecular weight within the range of from 1,000 to 200,000.

13. A detergent composition as claimed in claim 12, wherein the polymer has a number-average molecular weight within the range of from 2,000 to 50,000.

14. A detergent composition as claimed in claim 1, wherein the polymer has a weight-average molecular weight within the range of from 2,000 to 2,000,000.

15. A detergent composition as claimed in claim 14, wherein the polymer has a weight-average molecular weight within the range of from 3,000 to 1,000,000.

* * * * *